UNITED STATES PATENT OFFICE.

DANIEL C. HERB, OF SALINEVILLE, OHIO.

BAKING COMPOUND.

980,635.

Specification of Letters Patent. Patented Jan. 3, 1911.

No Drawing.

Application filed December 23, 1909. Serial No. 534,720.

*To all whom it may concern:*

Be it known that I, DANIEL C. HERB, a citizen of the United States of America, and resident of Salineville, county of Columbiana, and State of Ohio, have invented certain new and useful Improvements in Baking Compounds, of which the following is a specification.

This invention relates to an artificial product or compound intended to be used in the preparation of material for culinary or baking purposes.

The object of the invention is to provide, in a form convenient for handling or shipping and which will not deteriorate in quality with age or with changes of temperature, a compound or substance for use in cooking, and particularly in baking, which shall embody all, or most, of the desirable and necessary elements of a natural egg.

A further object is to produce a compound of the character mentioned which shall possess certain advantages over the eggs for which they are substituted in baking recipes, such, for instance, as contributing to the production of a larger yield of the baked product and the production of a baked product which retains moisture for an increased period. And a further object of the invention is to produce an inexpensive compound, in a form convenient for immediate use and adapted to resist deterioration both in quantity and quality for an unlimited time, which may either partially or wholly displace the necessity for the use of eggs in baking recipes.

The invention consists in the combination, in the form of a dry powder, of certain substances or elements in proper proportions, which, when mixed with milk and water in certain proportions, contains practically the same properties as the egg of a fowl.

The compound consists of the following elements: flour, corn starch, sugar, chlorid of sodium, and hydrogen potassium tartarate, the latter commonly known as cream of tartar. These elements or ingredients are compounded in substantially the following proportions, measured by weight:

Flour _____ 28.5 per cent.
Corn starch _____ 28.5 per cent.
Sugar _____ 28.5 per cent.
Chlorid of sodium _____ 7.25 per cent.
Hydrogen potassium tartarate _____ 7.25 per cent.;

or, in other words, equal weights of flour, corn starch and sugar are mixed with equal weights of chlorid of sodium and cream of tartar, the weight of each of the two last named ingredients being about one-fourth that of each of the three first named ingredients.

When the above-named ingredients have been thoroughly mixed in substantially the proportions stated, the resultant product constitutes my baking compound. Variations in the proportions above specified may be made within a limited range without materially changing or affecting the efficacy of the product for its intended purpose.

While the compound may be made to wholly dispense with the use of eggs in a given recipe, I have found by experiment that in a recipe calling for a large number of eggs the product may be slightly improved by the addition of a small number of eggs. For instance, in a baker's recipe calling for fifty eggs, the product will be practically the same when one pound of the compound and four eggs are employed as when the fifty eggs called for are used.

The compound being a comparatively cheap one to produce, it will thus be seen that the use thereof results in great economy.

In using the compound, milk and water are added in substantially the ratio of one quart each to a pound of the powder. When thoroughly mixed or diffused, the resultant solution is ready for immediate use as a substitute for eggs in the recipe. As above stated, however, the addition of eggs in the ratio of four to a pound of the compound effects a slight improvement in the quality of the product, and, in fact, results in said product being equally as palatable, pure and wholesome as that produced in the ordinary manner.

Having thus described my invention, what I claim as new, and desire to secure by Letters Patent, is—

The herein-described compound, consisting of a powder composed of the following-named ingredients in substantially the proportions stated, viz.: equal weights of flour, corn-starch and sugar, and equal weights of chlorid of sodium and cream of tartar (hydrogen potassium tartarate), the weight of each of the last-named elements being one-fourth the weight of each of the first-named elements.

In testimony whereof I affix my signature in presence of two subscribing witnesses.

DANIEL C. HERB.

Witnesses:
H. R. SHAFF,
J. HUNT BEARD.